Jan. 26, 1932.                 W. R. LORD                  1,842,455
         METHOD OF AND APPARATUS FOR MAKING POURING SPOUT CAN COVERS
                       Filed Feb. 21, 1929        9 Sheets-Sheet 4

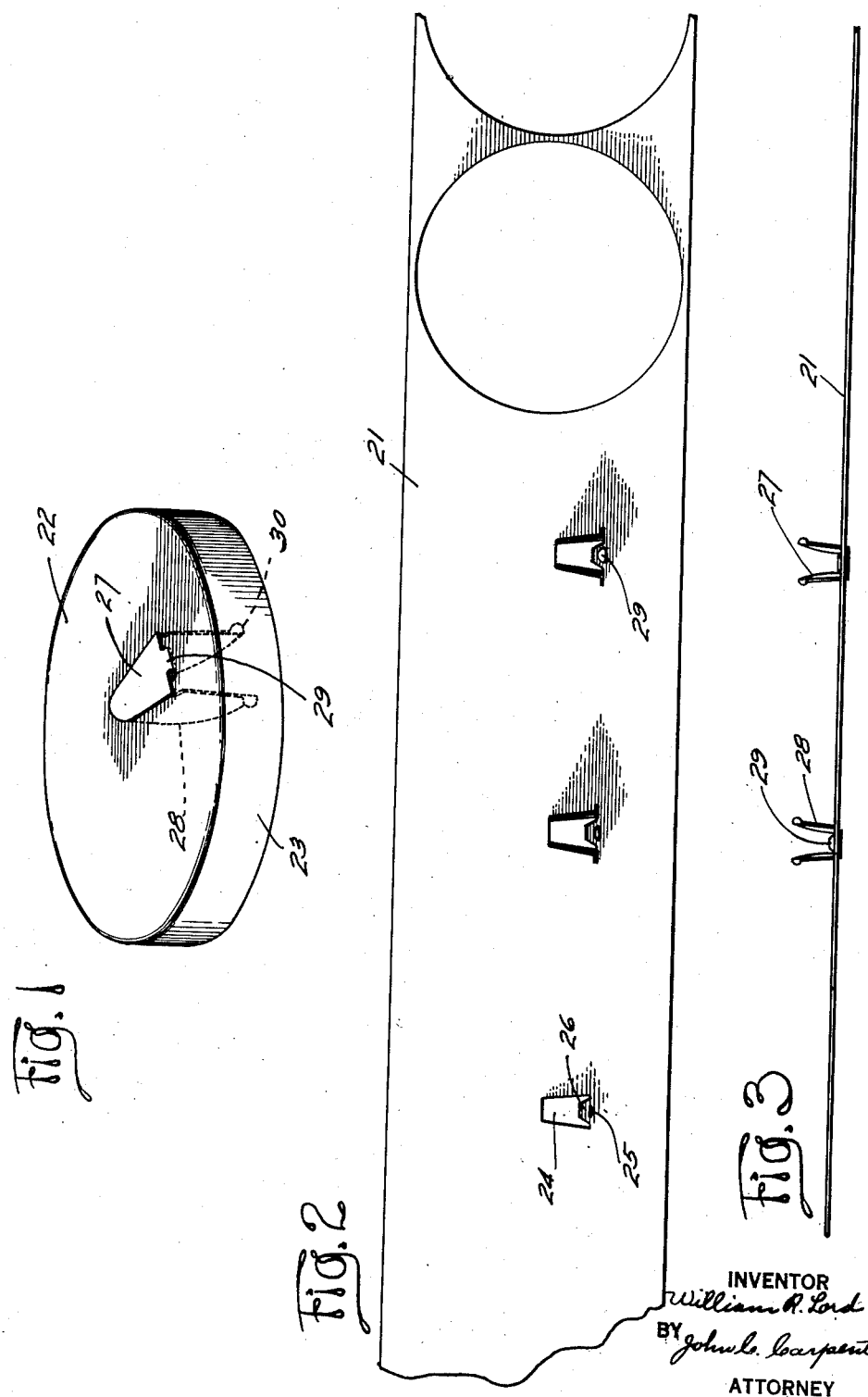

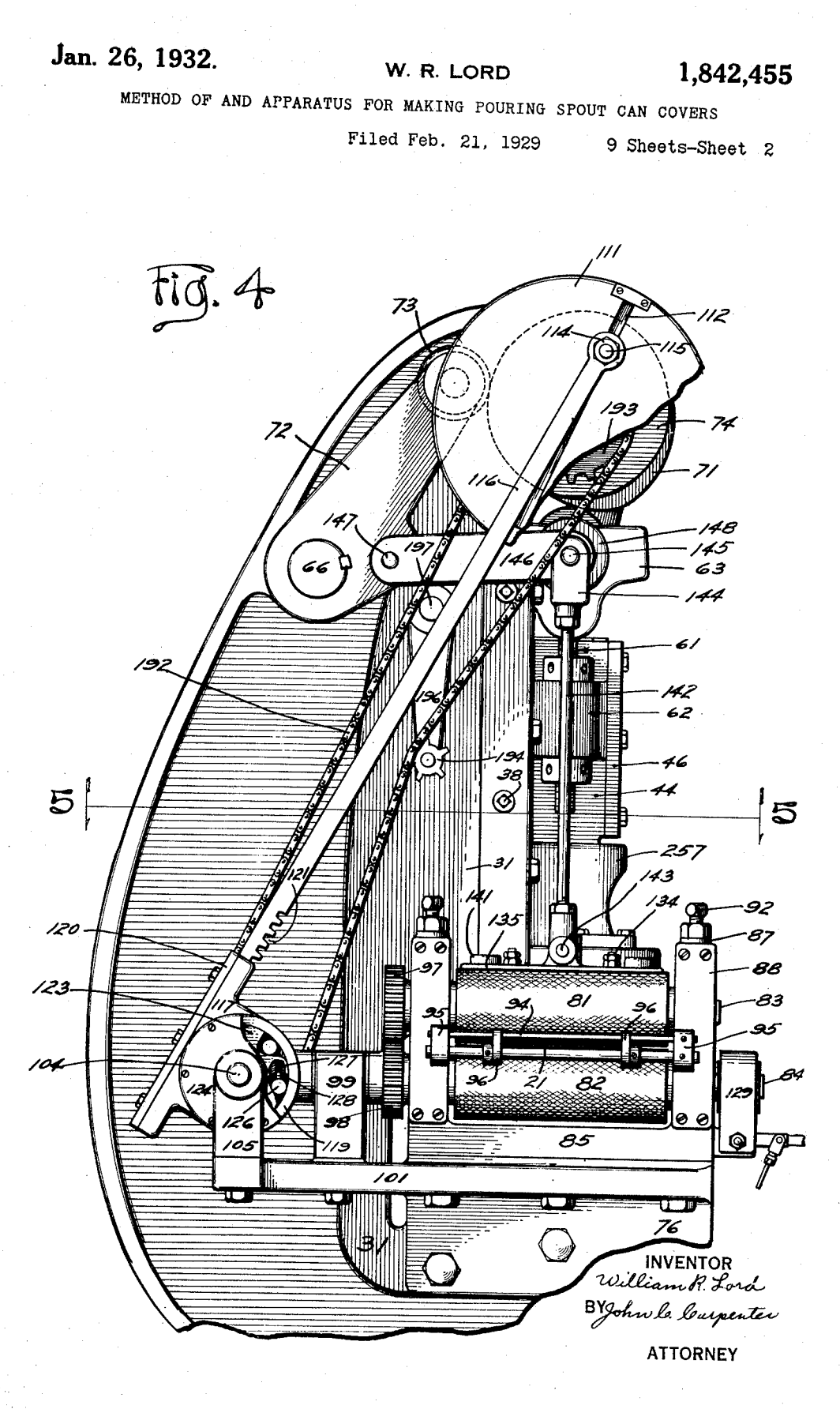

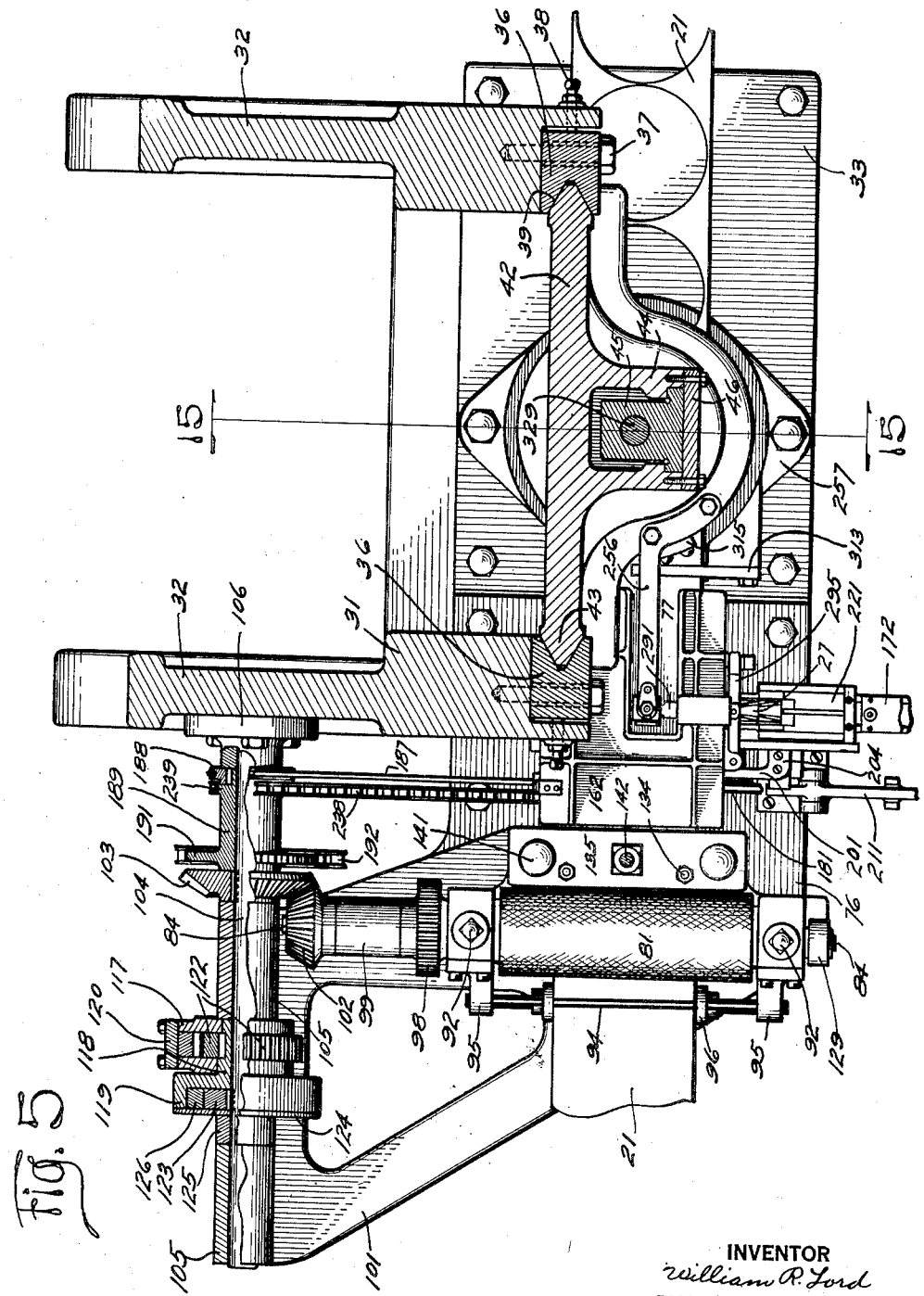

INVENTOR
William R. Lord
BY John C. Carpenter
ATTORNEY

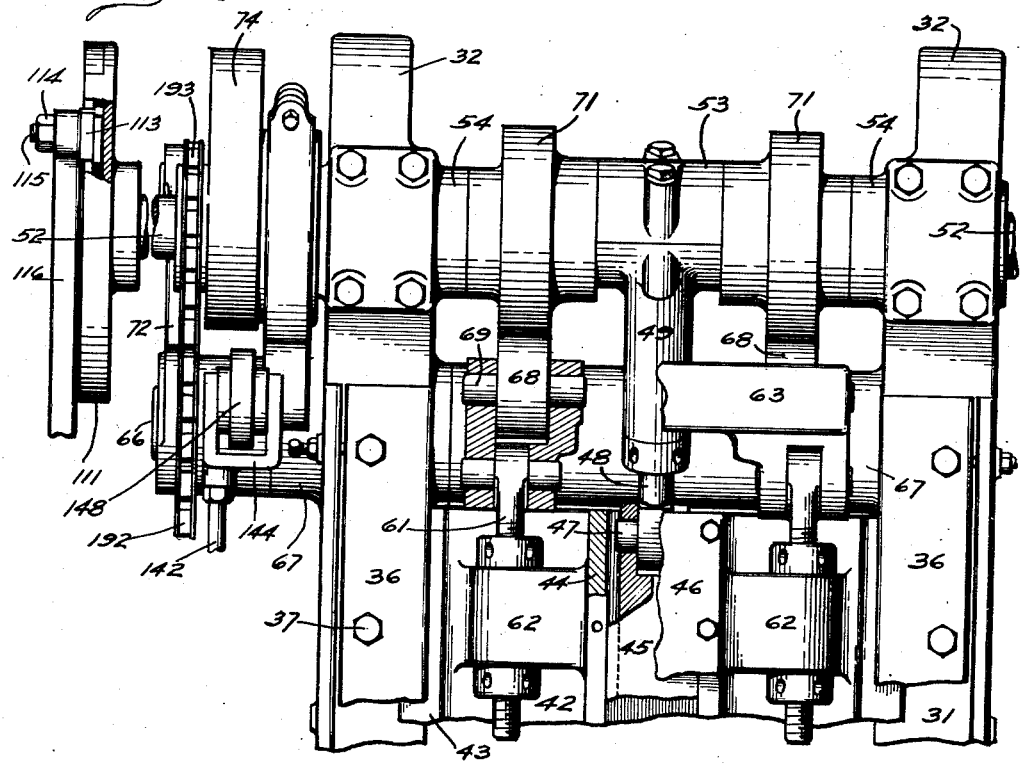
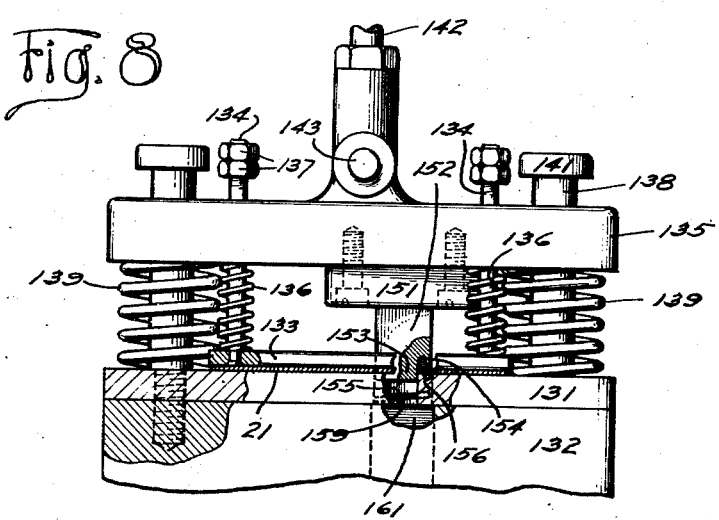

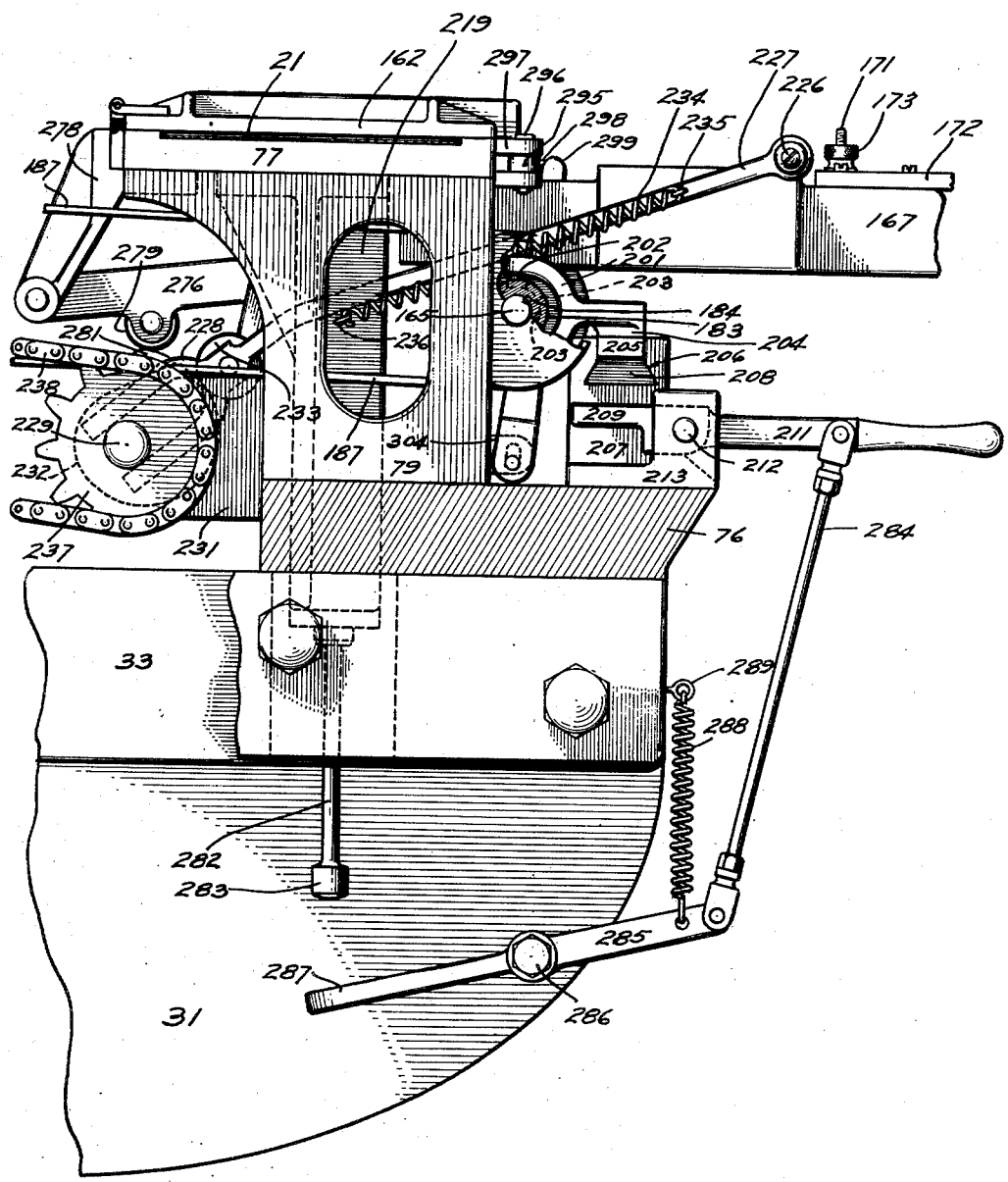

Jan. 26, 1932.  W. R. LORD  1,842,455
METHOD OF AND APPARATUS FOR MAKING POURING SPOUT CAN COVERS
Filed Feb. 21, 1929   9 Sheets-Sheet 7

INVENTOR
William R. Lord
BY John C. Carpenter
ATTORNEY

Jan. 26, 1932. W. R. LORD 1,842,455
METHOD OF AND APPARATUS FOR MAKING POURING SPOUT CAN COVERS
Filed Feb. 21, 1929   9 Sheets-Sheet 8
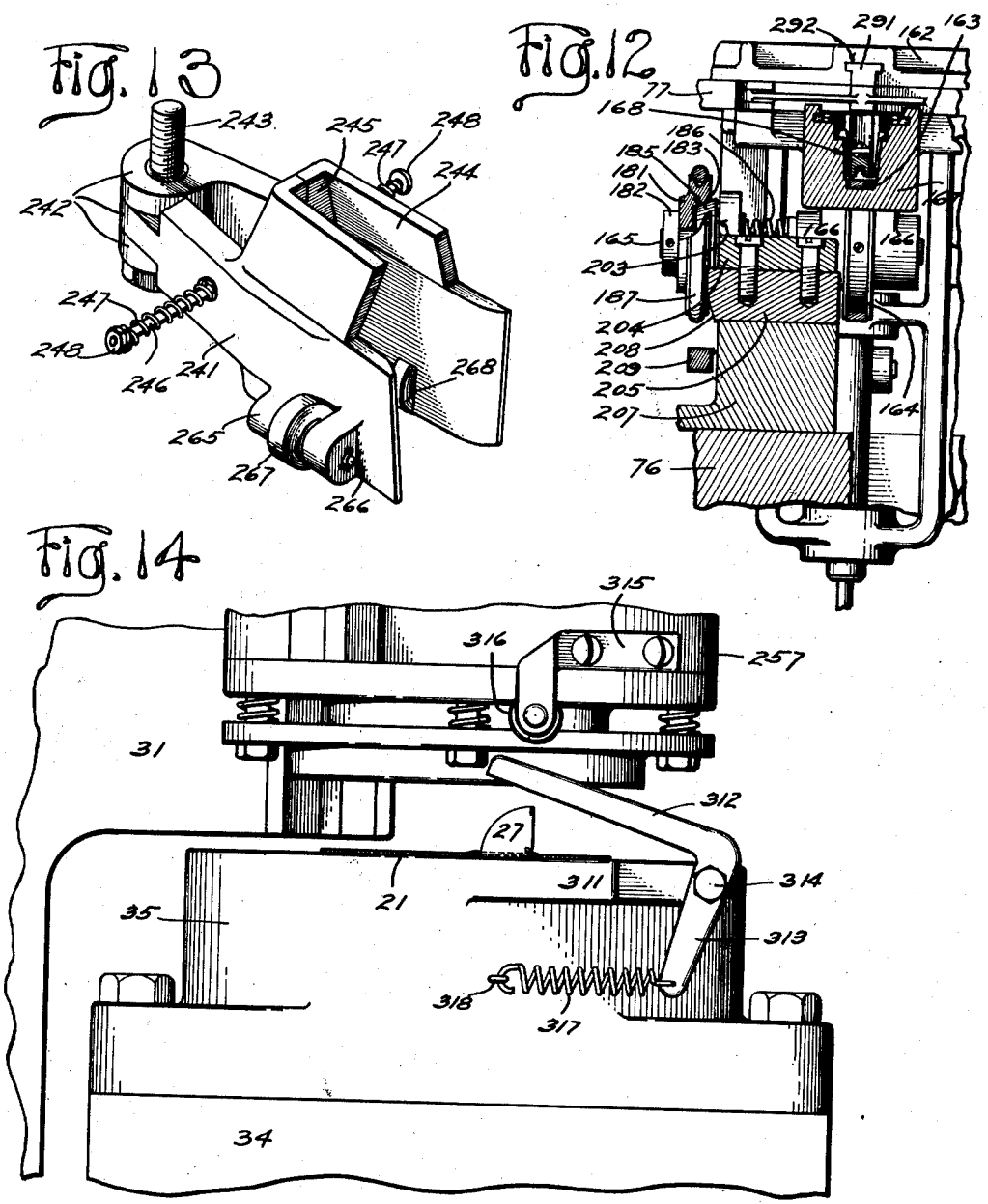
INVENTOR
William R. Lord
BY John B. Carpenter
ATTORNEY

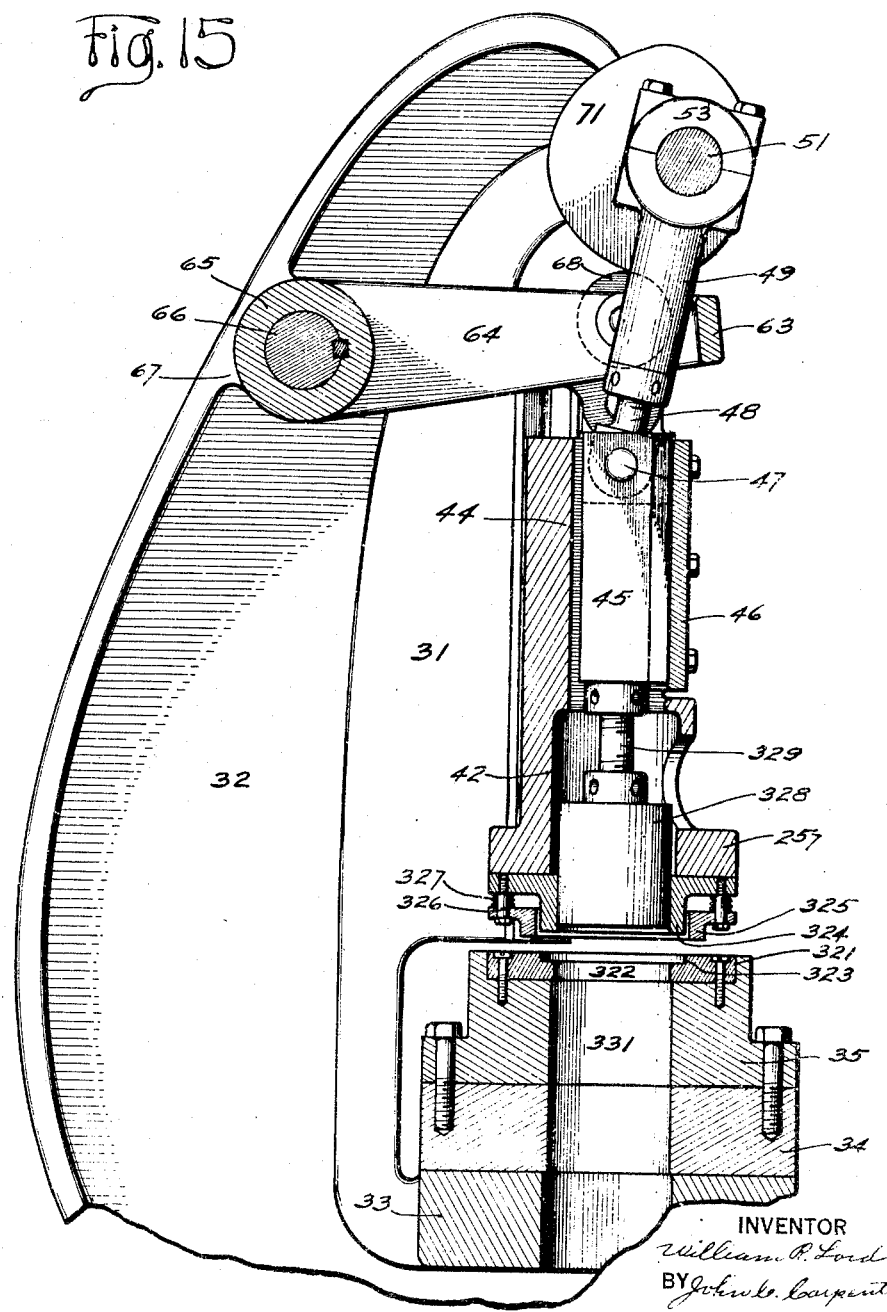

Patented Jan. 26, 1932

1,842,455

UNITED STATES PATENT OFFICE

WILLIAM R. LORD, OF MATAWAN, NEW JERSEY, ASSIGNOR TO AMERICAN CAN COMPANY, OF NEW YORK, N. Y., A CORPORATION OF NEW JERSEY

METHOD OF AND APPARATUS FOR MAKING POURING SPOUT CAN COVERS

Application filed February 21, 1929. Serial No. 341,538.

This invention relates to machines for producing can covers in which pouring spouts are inserted and movably secured, and to a method for producing said covers.

The principal object of the present invention is the provision of a machine which cuts an opening in a cover strip of sheet material, inserts a formed pouring spout within the opening and secures it to a part of the cover strip adjacent the opening, which removes from the cover strip a cover blank containing the attached spout, and then forms the blank into a can cover.

An important object of the invention is the provision of feeding devices which advance a cover strip by an intermittent movement through various operating stations, and clamping devices arranged at these stations which clamp and hold the cover strip during the periods of rest of the feeding devices, and during the operations of the mechanisms at such stations.

Still another important object of the invention is the provision of spout inserting mechanism which receives a formed spout having resilient side wings and which assembles and attaches the spout to a can cover part by temporarily springing the side wings inwardly to permit their insertion within an opening in the can cover part and which then secures together an element of the inserted spout and an element of the can cover part.

A further object of the invention is the provision of devices for automatically assembling and attaching a formed pouring spout and a can cover wall, by a connection which permits subsequent hinging of the spout relative to the can cover.

Another object of the invention is the provision of a machine for inserting a spout into an opening in a can cover part comprising automatically operating spout feeding devices for presenting formed spouts to a spout inserting mechanism and a manual control for interrupting the feeding of spouts to the inserting mechanism without stopping the other operating parts of the machine.

Numerous other objects and advantages of the invention will be apparent as it is better understood from the following description, which, taken in connection with the accompanying drawings discloses a preferred embodiment thereof.

Referring to the drawings:

Figure 1 is a perspective view of a pouring spout can cover made according to the present invention;

Fig. 2 is a fragmentary plan view of a cover strip of sheet material, in which is placed inserted pouring spouts.

Fig. 3 is a side elevation of that portion of the strip and spouts illustrated in Fig. 2;

Fig. 4 is an end elevation of the apparatus, parts being broken away, the view being taken from the feed-in end of the machine;

Fig. 5 is a sectional plan view of the apparatus, being taken substantially along line 5—5 of Fig. 4;

Fig. 7 is a front elevation of the upper part of the machine, parts being broken away;

Fig. 8 is a side elevation, partly in section, taken substantially along line 8—8 in Fig. 6;

Fig. 9 is a sectional view taken substantially along line 9—9 in Fig. 6;

Fig. 12 is a longitudinal section taken substantially along line 12—12 in Fig. 11;

Fig. 13 is a perspective detail of the spout holding instrumentalities;

Fig. 14 is a side elevation of a part of the can cover blanking and forming mechanism, the view being taken from a position illustrated by the line 14—14 in Fig. 6, and Fig. 15 is a transverse sectional view taken substantially along line 15—15 in Fig. 5.

Figure 6:
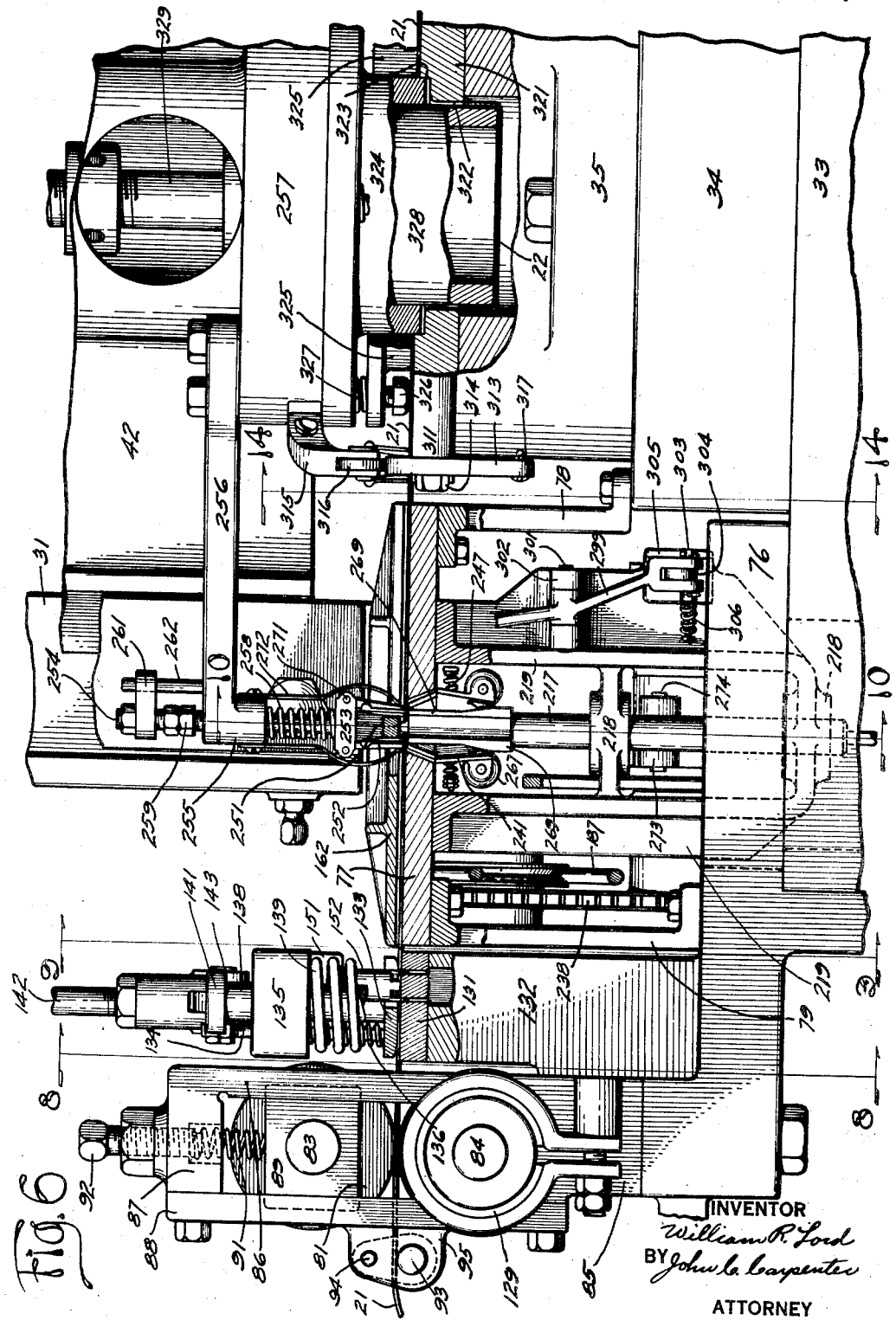
Fig. 6 is a front elevation of the lower part of the machine, parts being broken away and parts being shown in section.

The apparatus of the present invention contemplates the automatic feeding, through a number of stations, of a cover strip 21 (Fig. 2) of sheet material from which is blanked and formed a can cover 22 having side walls 23. Mechanism is located at one station which cuts a spout opening 24 in the strip 21 and a slit 25 adjacent, this leaving a tongue 100

26 projecting within said opening. A formed pouring spout 27 (Fig. 1) having resilient side wings 28 and which may have extended stop lugs 30, is automatically positioned within the opening 24 by mechanism operating at a second station, a depending tang 29 being inserted through the slit 25. The tang 29 is then clinched over the tongue 26 by mechanism at a third station, this forming a hinge connection for the pouring spout 27 and the strip 21. A can cover 22 is then blanked and formed from that part of the strip 21 containing the spout 27, by mechanism operating at a fourth station, the final operation producing a pouring spout can cover.

The apparatus of the present invention is well adapted to the manufacture of the standard salt can pouring spout cover which is preferably formed of fibrous material and which has a hinged pouring spout made of sheet metal. For the purpose of illustration the machine herein is shown in connection with the manufacture of such a spout can cover.

Structurally the apparatus of the present invention comprises, as a major part, a punching and forming press mechanism of a standard double operation type. The frame of the press carries all of the machine parts including a table over which the strip 21 is fed in a step by step movement by feeding rollers receiving intermittent movement from connection with the crank shaft of the press mechanism. During the different rest periods of the strip 21, the mechanisms at the various stations operate successively as to a particular can cover, upon a part of the cover strip as it is presented to such mechanisms.

Inasmuch as the press mechanism constitutes the supporting and primary actuating structures upon which all of the other elements of the apparatus are dependent, this mechanism will first be briefly described.

It comprises a press frame 31, (Figs. 5, 6, 7 and 15) which is formed with side walls 32 extending into and formed integrally with a supporting bed 33. A bolster plate 34 is carried by the bed 33 and supports a die block 35 which carries the lower die parts.

Slide gibs 36 are adjustably secured by lock bolts 37 against the front face of the press frame 31. Adjusting screws 38 passing through parts of frame 31 and bearing against the gibs 36 insure accurate adjustment. Each gib 36 is formed with a V groove 39 in which moves a blanking punch slide 42 formed with tapered side edges 43 resting within and corresponding to the V groves 39 of the gibs 36. Movement of the gibs toward or from the slide 42 by action of the screws 38 tightens or loosens the bearing action of their V-grooves against the edges of the slide. The bolts 37 extend through enlarged openings in the gibs and as the desired adjustment is made are screwed home, their heads tightly clamping and holding the gibs in adjusted position.

Slide 42 carries a central housing 44 in which is movably mounted a draw punch slide 45, the latter being held in sliding position by a face plate 46 bolted to the housing 44. Slids 42 and 45 carry parts of the punch blanking and forming mechanism which will be hereinafter fully explained.

Slide 45, (Figs. 7 and 15) is pivotally connected at 47 to a rod 48 adjustably secured to a pitman 49 extending over a crank 51 of a press crank shaft 52, a pitman cap 53 being bolted to the pitman 49. Crank shaft 52 rotates within bearings 54 formed in the side walls 32 of the press frame and is rotated in any usual or preferred manner.

Eye bolts 61 adjustably secured to blocks 62 formed integrally with slide 42, (Figs. 4, 7 and 15) are pivotally connected with a yoke frame 63 having side arms 64 extending rearwardly and forming parts of a sleeve 65 keyed to a rock shaft 66 mounted in bearings 67 in the side walls 32. Slide 42 is raised and lowered by movement of yoke 63 which carries a pair of cam rollers 68 rotatably mounted on shafts 69. Each cam roller 68 engages a cam 71 carried by the crank shaft 52, this constituting elements used in a part of the yoke movement. Shaft 66 carries a lever 72 positioned outside of and adjacent one of the side walls 32 and said lever carries a cam roller 73 engaging the surface of the cam 74 secured to shaft 52. This constitutes elements used in the second part of the yoke movement cam 74 being complementary to cams 71.

The feeding mechanism for cover strip 21 is carried on a bracket 76 (Figs. 5 and 6) secured to bed 33. In its travel through the machine cover strip 21 passes over a table 77 carried by a bracket 78 bolted to the bolster plate 34 and by a bracket 79 bolted to the bracket 76.

The cover strip (Figs. 4, 5 and 6), passes between feeding rollers 81 and 82 secured respectively to parallel shafts 83 and 84, the latter being rotatably mounted in a bracket 85 carried by bracket 76. Bracket 85 is formed with a pair of spaced upwardly extending arms 86 surmounted by spacer blocks 87, which are connected to the lower part of the bracket by front plates 88. Shaft 83 is rotatably mounted in blocks 89 sliding vertically within the bracket 85 each block 89 moving between the spaced members 86 and 88. A spring 91 is interposed between each block 89 and an adjusting bolt 92 threaded within each spacer block 87.

Strip 21 herein shown as a continuous ribbon passes between spaced rods 93 and 94, both rods being carried in brackets 95 formed in the front plates 88. These rods guide the strip into the feeding rollers and guide plates 96 adjustably secured upon the rods 93 confine the strip laterally.

Shafts 83 and 84 carry respectively intermeshing gears 97 and 98 this insuring a unity of movement of the feed rollers during the advancing of strip 21. Shaft 84 (Figs. 4 and 5) extends beyond its gear 98 and through a bracket 99 carried by an extension 101 of the bracket 76 and carries a bevel gear 102 which meshes with a similar gear 103 keyed to a shaft 104 mounted in bearings 105 carried on extension 101 and in a bearing 106 bolted to one of the side walls 32 of the press frame.

Shaft 104 is intermittently rotated by connection with the crank shaft 52, this connection comprising a disk 111 (Figs. 4 and 7) secured to one extremity of crank shaft 52, the disk being provided with a radial slot 112 in which is adjustably secured a sliding block 113 held in adjusted position by a lock nut 114 threadedly engaging a bolt 115 carried by the block 113. Block 113, by being moved to a different position along its slot and by thus being positioned closer to or farther from the center of the disc is carried in a different circle of rotation for each adjusted position this affecting movement or stroke of a rack bar 116 which is pivotally mounted about bolt 115. Bar 116 extends at its lower end into a casing 117, (Figs. 4 and 5) rotatably mounted upon a stem 118 of a clutch housing 119 loosely mounted on shaft 104. Bar 116 has sliding movement within the casing 117 and the lower end of the bar is provided with rack teeth 121 which mesh with a gear 122 keyed to the stem 118. A plate 120 secured to the casing 117 retains the bar 116 in sliding position.

Rack teeth 121 moving over gear 122 as bar 116 is raised and lowered with rotation of disk 111, partially rotates said gear and housing 119. During this rotation in one direction, clutch mechanism illustrated in Figs. 4 and 5 operates to lock together the housing and the shaft 104, which action by reason of the geared connecting gears 103 and 102 causes a corresponding movement of shaft 84 and feed rollers 82 and 81.

This clutch mechanism comprises a star wheel 123 keyed to shaft 104, the former being positioned within the housing 119 and held in place by a face plate 124 and a collar 125 mounted on shaft 104 adjacent the outer bearing 105. Small rollers 126 constitute the clutching elements and are positioned between the arms of the star wheel 123. These arms are shaped to cause a wedging of each roller 126 between its associated arm of the star wheel 123 and the housing 119 when the latter is moved in one direction, this being in clockwise direction in Fig. 4. Upon partial rotation of housing 119 in the reverse or counter clockwise direction, each roller 126 is moved away from wedging position and the housing 119 moves freely about star wheel 123. A coil spring 127 and a spring barrel 128 is positioned in each arm of the star wheel 123 and assists in moving each roller 126 into its clutched position.

A band brake mechanism of usual form and designated generally by the numeral 129 (Figs. 4 and 5) is mounted about shaft 84 and this insures positive stopping of the feed rollers 81 and 82 without any overthrow of the parts, when shaft 104 is unclutched from its driving connection. Such a brake mechanism may be adjusted to afford any proper frictional drag upon the shaft 84.

Mechanism for cutting the spout opening in the strip 21 is located at the first station. Strip 21 (Figs. 4 to 8 inclusive) as it passes this position is fed across a die plate 131 supported on a die block 132 carried by the bracket 76. Upon being brought to rest it is clamped upon the plate 131 by a presser foot 133 which carries upwardly projecting rods 134 slidably positioned within a cross head 135. Spring 136 are interposed between the upper surface of presser foot 133 and the lower surface of cross head 135 and as the latter is lowered the presser foot clamps against the strip 21 under the compression of the springs 136. Lock nuts 137 secured to the upper end of each rod 134 permit lifting of the presser foot 133 with the raising of cross head 135.

Studs 138 project upwardly from die plate 131, are threadedly secured to the die block 132 and extend through openings formed in the cross head 135. The latter has movement relative to the studs 138 and a coil spring 139 positioned about each stud 138 is interposed between the die plate 131 and the cross head 135 and these springs hold the crosshead in raised position excepting when the same is depressed by a mechanism best illustrated in Fig. 4. A head 141 of each stud 138 limits the raised position of the cross head 135 under the action of the springs 139.

The depressing mechanism for the cross head 135 comprises a connecting rod 142 pivotally connected at 143 to the cross head 135 and adjustably secured at its upper end within a yoke 144 pivotally mounted on a pin 145 carried by a lever 146 pivoted on a pin 147 carried by the arm 72 (Figs. 4 and 7). Pin 145 carries a cam roller 148 which is positioned between the arms of the yoke 144. Cam 74 at certain periods in its rotation with the crank shaft 52 engages the roller 148 and moves it downwardly and through the described connections depresses the cross head 135 against the action of springs 139. At other times springs 139 hold the cross head 135 upwardly against the heads 141 of the studs 138, cam roller 148 then being held in the position illustrated in Fig. 7, out of contact with the cam 74.

Cross head 135 carries a punch block 151 from which is projected a punch 152 provided with cut edges 153 and 154. Punch 152 is held above and out of contact with the strip 21 when crosshead 135 is in raised position, the presser foot 133 at such time also being held in raised position. With crosshead 135 moving downwardly, after presser foot 133 has yieldingly engaged and clamped strip 21, the cut edges 153 and 154 come into contact with and pass through the strip 21, cut edge 153 cooperating at such a time with the walls of a die opening 155 formed in the die plate 131 and cut edge 154 cooperating with the walls of a die opening 156 also formed in said plate, see Feg. 8.

During this action a punching 159 is cut from the strip 21 leaving the spout opening 24 and the slit 25 in the strip. The punching 159 is forced downwardly through the die opening 155 whereupon it falls through a channel 161 formed in the die block 132. It will be understood that as crosshead 135 is raised by springs 139 following the action just described, it will engage the nuts 137 of rods 134 and lift the presser foot 133 of the strip 21.

On the next strip feeding operation the newly formed opening 24 in strip 21 is moved to the second operating station, the strip during this movement passing over table 77 and beneath a retaining plate 162 (Figs. 5 and 6) carried by table 77. It is at this second station that a formed pouring spout is inserted within the opening 24.

Figure 11:
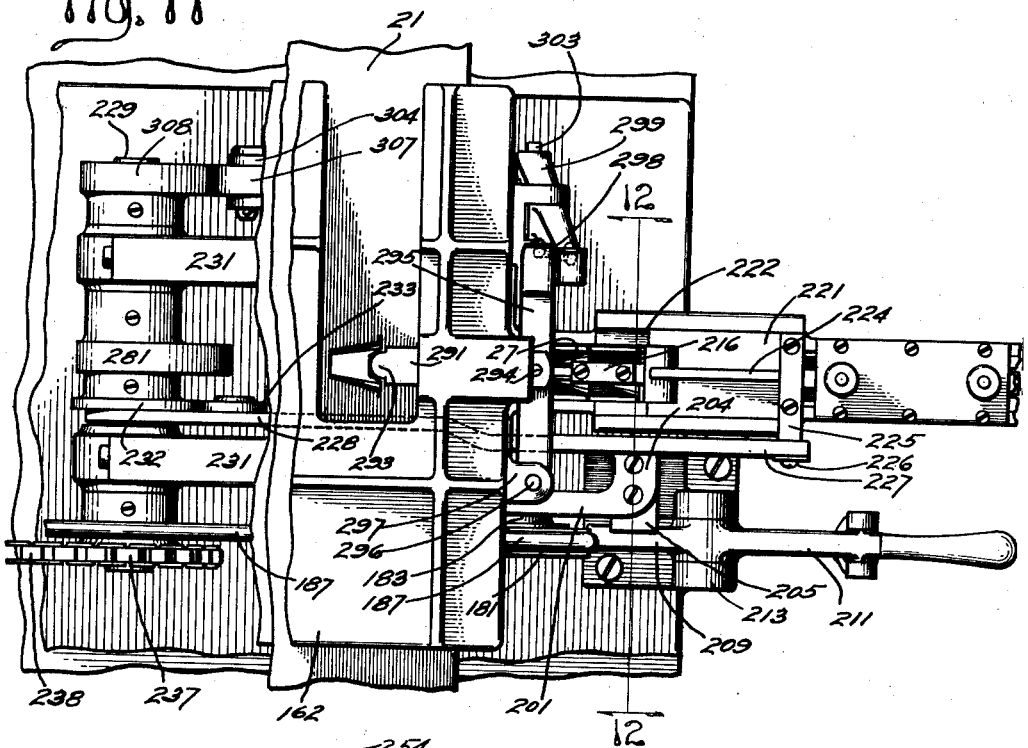
Fig. 11 is a fragmentary plan of the mechanism illustrated in Fig. 10.
Figure 10:
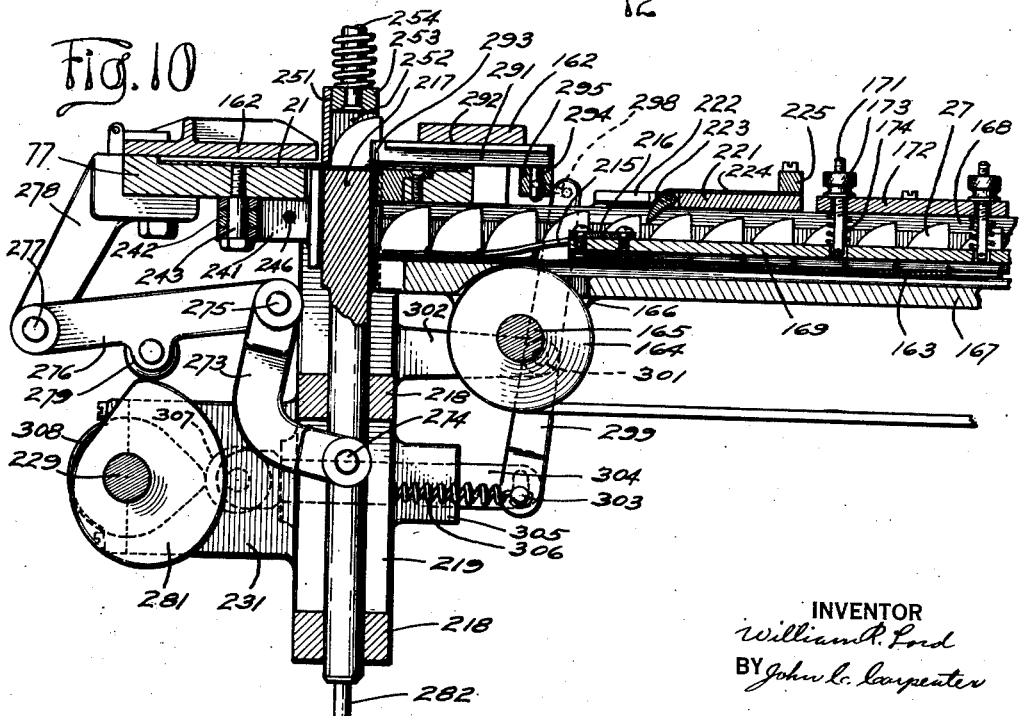
Fig. 10 is a sectional view taken substantialy along line 10—10 in Fig. 6.

The formed spouts 27 are brought into the machine at right angles to the travel of the strip 21 across the table 77 (Figs. 10 and 11). The spouts 27 are carried in processional order by a belt 163 passing over a drive pulley 164 secured to a shaft 165 journalled in brackets 166 projected from the under surface of a bracket 167 secured to the table 77. Belt 163 and spouts 27 move through a V-shaped channel 168 formed in the bracket 167 (see Fig. 12).

Also positioned within the channel 168 is a retaining bar 169 (Fig. 10) resting directly above and clear of the upwardly extending tang 29 of each spout 27 and extending between the side wings 28 of the spout. Retaining bar 169 is yieldingly supported on rods 171 carried by a cover plate 172 resting upon and secured to bracket 167. Each rod 171 passes through an opening formed in the cover plate 172 and is threadedly engaged with a thumb screw 173 which holds the same in adjusted position. A coil spring 174 is positioned about each rod 171 and is interposed between the plate 172 and the retaining bar 169.

Pulley 164 and shaft 165 normally rotate to continuously feed the spouts 27 along the channel 168 and within the second operating station. Shaft 165 receives its rotation from a continuously rotating sheave 181 (Fig. 12) mounted thereupon. Sheave 181 is positioned between a collar 182 secured to the shaft 165 and a cone disc clutch member 183 having sliding movement longitudinally of shaft 165 and along a feather 184 carried thereby (Fig. 9). Sheave 181 is provided with a conical depression 185 corresponding to and permitting at certain times frictional engagement with the surface of the cone disc 183. Cone disc 183 is normally moved into such frictional engagement or clutch position (as shown in Fig. 12) by a coil spring 186 positioned about shaft 165 and interposed between the disc 183 and one of the bearings 166. In clutched position rotation of the sheave 181 is imparted to the shaft 165 and pulley 164 and feed belt 163 moves to convey the spouts 27 forwardly.

A belt 187 operates over sheave 181 (Figs. 9, 11 and 12) and also passes over a sheave 188 (Fig. 5) keyed to a sleeve 189 loosely mounted on shaft 104. Sleeve 189 is formed integrally with a sprocket 191 over which operates a chain 192. Chain 192 passes over a sprocket 193 (Figs. 4 and 7) carried by the crank shaft 52. Chain 192 is also engaged by a chain tightener sprocket 194 carried by an arm 196 adjustably held by a shaft 197 mounted in the press frame.

Manual means are provided for sliding the cone disc 183 (Figs. 9 and 12) along shaft 165 and out of engagement with the rotating sheave 181 this sliding movement being against the action of spring 186. This control comprises a bifurcated arm 201 which carries trunnions 202 engaging within a groove 203 formed in a stem of the disc 183. Arm 201 is formed with an extension 204 which is bolted to a slide 205 mounted within a V groove 206 formed in a block 207 carried by the bracket 76. Slide 205 is formed with an inclined surface 208 which is engaged by an extension 209 of a handle lever 211 pivoted on a pin 212 secured to a bracket 213 carried by the bracket 76. As handle lever is depressed its extension 209 is raised against and along the incline surface 208 moving the slide 205 against the action of spring 186 and removing the cone disc 183 from its clutched position within the conical depression 185 of the sheave 181 thereby disengaging connection between shaft 165 and sheave 181.

The spouts 27 as they move in processional order with the belt 163 touch one another, adjacent spouts being interengaged as illustrated in Fig. 10. As a spout 27 reaches the position where the belt 163 passes over the pulley 164 it is further advanced by the spouts following. As shown in the drawing approximately three spouts are pushed beyond the line of center of the axis 165 of the pulley 164 and in this forward position are held downwardly in the channel 168 of the bracket 167 by a spring finger 215 secured by a plate 216 upon the forward end of the retaining bar 169. The foremost spout 27 in this position is adjacent a vertically moving spout inserting tool 217 (Figs. 6 and 10) sliding in bearings 218 carried by a bracket 219 secured to table 77. Inserting tool 217 is normally in its lowered position as the foremost spout 27 passing along the channel 168 approaches. With the tool 217 in its lowermost position its upper face at such time being in line with or slightly below the lowest part of the approaching spout, reciprocating mechanism operates to feed the foremost spout into position upon the tool 217.

This reciprocating mechanism constitutes a secondary spout feeding device supplementing the belt feed and comprises a slide 221 (Figs. 10 and 11) operating within guideways 222 formed in the bracket 167 adjacent the top surface thereof. Slide 221 carries a downwardly projecting feed dog 223 pivoted to the forward end thereof and held normally in projected position by a leaf spring 224.

Slide 221 carries a bar 225 (Figs. 9 and 11) which is pivotally connected at 226 to an arm 227 extending downwardly and toward the center of the machine. Bar 227 at its forward end extends into an integrally formed cam yoke 228 which stradles a horizontal cam shaft 229 journalled in brackets 231 projected from bracket 219, see also Fig. 10.

Shaft 229 (Figs. 9, 10 and 11) carries a cam 232 mounted adjacent the yoke 228, said cam being engaged by a cam roller 233 carried by the yoke 228. A coil spring 234 interposed between a pin 235 carried by the bar 227 and a pin 236 projected from the bracket 219 insures a contact between the cam roller 233 and the face of the cam 232.

Shaft 229, (Figs. 5, 9 and 11) is constantly rotating, it carrying a sprocket 237 over which operates a chain 238 also passing over a sprocket 239 formed integrally with the sleeve 189. Constant rotation of shaft 229 and the cam 232 carried thereby thus causes the forward feeding movement of the slide 221 and the positioning of a spout on the spout inserting tool 217. As slide 221 moves backwardly following the feeding movement spring 224 permits dog 223 to rock about its pivot and move over a spout following behind after which it is in position for its next forward feeding operation.

The foremost spout in its position upon tool 217 rests within spout holding instrumentalities positioned thereabouts. These instrumentalities, illustrated in detail in Fig. 13, comprise side wings 241 positioned on opposite sides of the tool 217 and extending at their rear extremities into bosses 242 forming hinge elements having movement about a stud 243 secured to table 77, (see also Fig. 10). Wings 241 are projected upwardly into directing side walls 244 and abutting walls 245.

When the spout 27 is first inserted between the side wings 241 the same are in closed position, this being the position illustrated in Fig. 13, the abutting walls 245 contacting each other at such time. A rod 246 extends through the two side wings 241 and coil springs 247 positioned around each end of rod 246 are interposed between the outer surface of each wing and lock nuts 248 threadedly secured to the said rod. This construction normally holds the instrumentalities in their closed position.

Spout 27 in its position upon tool 217 is beneath and in axial alignment with the opening 24 in the strip 21. A clamping device next comes into play to hold the part of strip 21 adjacent opening 24 against the upper surface of table 77 to permit insertion of the spout 27 within the said opening. This clamping device comprises a cage 251 (Figs. 6 and 10) provided with hinged side walls 252 and a head 253.

Head 253 carries an upwardly extending rod 254 passing through a boss 255 formed integrally with an arm 256 bolted to a punch ring 257 formed integrally with the blanking punch slide 42. A coil spring 258 positioned about rod 254 and interposed between the head 253 and the boss 255 tends to separate these parts. Lock nuts 259 carried by rod 254 form a stop for limiting the downward movement of rod 254 when fully lowered under the action of the spring 258. The upper end of rod 254 is threadedly secured to a plate 261 projecting loosely over a pin 262 carried by the arm 256. This prevents oscillation of rod 254 about its own axis but at the same time permits sliding movement of the rod therein.

Cage 251 of the clamping device just described is brought into clamping position upon the upper surface of the strip 21 as slide 42 moves downwardly the spring 258 yielding and allowing sliding movement between rod 254 and boss 255 this insuring a spring clamping action. Rear wall of the cage 251 rests adjacent one end of the opening 24 and side wings 252 rest adjacent the side walls of the opening 24. In this clamped position strip 21 is ready to receive the spout resting on inserting tool 217.

Tool 217 is thereupon raised to move pouring spout 27 upwardly and to pass its side wings 28 through the opening 24. During this lifting action side wings 28 are engaged by the slanting directing walls 244 (Figs. 6, 10 and 13) which spring the same inwardly sufficiently to pass the lugs 30 clear of the edges of the opening 24, the spout passing entirely through and beyond the directing walls 244 of the holding instrumentalities. To permit this complete removal of the spout the holding instrumentalities are hingedly separated.

Each side wing 241 (Fig. 13) carries two projecting bosses 265 in which is inserted a pin 266 mounting a roller 267 extending inwardly through an opening 268 cut in the wing. Cam plates 269 (Fig. 6) are carried on opposite sides of the upper end of the inserting tool 217 and as the said tool approaches the upper end of its travel enlarged portions of the cam plates 269 engage between the rollers 267 and force the side wings 241 outwardly in a hinging movement about the stud 243, the springs 247 permitting this action. The directing walls 244 are thus separated allowing clearance of the spout 27 as it is removed therefrom and fully inserted within the opening 24. The tang 29 of the spout is at the same time forced through the slit 25. After the spout 27 passes beyond and is released from the directing walls 244, these walls are returned to normal closed position by the springs 247, this action taking place after lowering of the tool 217.

The side walls 28 of the pouring spout 27 being resilient and normally spreading outwardly tend to assume this spread position when the spout is fully inserted, and at such time these wings press against the side walls 252 of the clamping device. These side walls are hingedly mounted on the head 253, as shown Fig. 6, to yield slightly, moving about their hinge pintles 271 when cage 251 is later raised, this movement taking place against the action of leaf springs 272 secured on the sides of boss 255 said springs pressing against the lower edge of each side wall 252. This prevents distortion of the wings 28.

The mechanism for raising and lowering the spout inserting tool 217 comprises an L-shaped link 273 (Fig. 10) pivotally connected at 274 to tool 217. Link 273 is also pivotally connected at 275 to an arm 276 in turn pivoted on a pin 277 carried by a bracket 278 secured to table 77. Arm 276 carries intermediate its length a cam roller 279 which engages a cam 281 secured to the shaft 229. The weight of the parts connected with arm 276 insures lowering of tool 217 when the shape of cam 281 permits.

When the manual control lever 211 is operated to stop the feeding of spouts 27 as previously described, tool 217 is held in raised position. Tool 217 (Fig. 9) carries at its lower end a projected rod 282 formed with a button head 283. As handle 211 is moved downwardly it moves a connecting link 284 pivotally connected with the handle and with a lever 285, the latter being in turn pivoted on a stud 286 carried by the press frame 31. This movement raises a forward end 287 of lever 285 against the button 283 thus lifting tool 217. As long as handle 211 is held in this lowered position, the tool 217 is held in raised position, this position will be held in raised position, this position being maintained against the action of a spring 288 interposed between the lever 285 and an eye bolt 289 carried by the bracket 76.

Said spring 288 restores the parts to normal position upon release of handle 211.

Immediately following the inserting of spout 27 within the opening 24 of the cover strip 21, while the spout is still retained at the inserting station, and while clamping cage 251 holds strip 21, mechanism operates for partially bending the tang 29 of the spout to prevent displacement during its movement with the strip 21 to the next operating station.

A slide 291 with a T head moves back and forth within a slot 292 formed in the plate 162, (Figs. 10, 11 and 12). During the insertion of spout 27 this slide 291 is in a backward position, a nose 293 thereof resting back of and adjacent to the slit 25 in the strip 21. Forward movement of slide 291 produces an initial bending of the tang 29, the extreme forward position being illustrated in Fig. 10.

Slide 291 carries a pin 294 which has pivotal connection with a horizontal lever 295 pivoted about a pin 296 carried by a projection 297 formed integrally with the table 77. The opposite extremity of lever 295 is pivotally connected, by a universal joint 298, with the upper end of a lever 299 pivoted on a pin 301 carried by projections 302 of one arm of bracket 219, (Fig. 6). The lower end of lever 299 is loosely connected with a pin 303 carried on a sliding bar 304 moving within a boss 305 formed integrally with one arm of bracket 219, (Figs. 6, 10 and 11). A coil spring 306 interposed between the pin 303 and bracket 219 at all times tends to move the sliding bar 304 toward the left as illustrated in Fig. 10, and thereby holds a cam roller 307 carried by bar 304 in contact with the peripheral surface of a cam 308 carried by shaft 229. When the high point of cam 308 moving against roller 307 forces the sliding bar 304 outwardly or toward the right, slide 291 is moved inwardly and its nose 293 engages the tang 29 and bends it to semi-clinching position, (Fig. 10).

Following this semi-clinching action, clamping head 251 is lifted and the strip feeding mechanism moves the inserted spout 27 and the strip 21 to the next operating station which is the clinching station. During this passage between stations the spout leaves the end of table 77 and moves over the upper surface of the die block 35, (Figs. 5, 6 and 14). At the clinching station the spout comes to rest upon a shoulder 311 formed integrally with the die block 35 and directly beneath an arm 312 of a bell crank lever 313 pivoted on a stud 314 carried by the block 35.

As slide 42 descends an arm 315 screwed to one side of the punch ring 257 moves downwardly therewith. Arm 315 is bent to support a roller 316 in vertical position directly above the arm 312 of the bell crank lever 313, and this downward movement brings roller 316 into engagement with arm 312 rocking the bell crank 313 about its pivot 314 and moving the arm 312 between the side wings 28 of the positioned spout 27 and against tang 29 bending it into its final clinched position. This movement of the bell crank lever 313 is resisted by a spring 317 interposed between it and an eye bolt 318 projected from the die block 35, and this spring returns the bell crank lever 313 to normal position after the clinching operation. It will be understood that extension 311 acts as an anvil cooperating with the arm 312 in the clinching operation. Upon lifting of the roller 316, and raising of the arm 312 out of contact with the wings 28 of the spout 27 the latter is advanced with the strip 21 to the next station.

The clinched spout 27 is thus brought to rest between the punch and die mechanisms positioned at the cover blanking and forming station. The die block 35 carries an inserted die plate 321 (Figs. 6 and 15) which is provided with a forming pass 322 and a blanking cut edge 323. Punch ring 257 carries a punch cut edge 324. Upon downward movement of slide 42 cut edges 323 and 324 cooperate to sever, from the strip 21 positioned therebetween, a can cover blank containing the inserted clinched spout 27.

During this blanking action the cover strip is held clamped to the upper surface of the die plate 321 by a stripper ring 325 loosely positioned about headed pins 326 projecting from a flange of the cut edge 324. A coil spring 327 surrounds each pin 326 and normally forces the stripper ring 325 outwardly and in advance of the lower edge of cut edge 324. In the blanking action therefore stripper ring 324 engages the strip 21 and holds it against the die plate 321, this ring at such time acting in a clamping capacity.

Immediately following the blanking of the cover part from the strip 21, a punch 328, carried on an adjustable stem 329 secured to slide 45, is lowered against the cover blank pressing it downwardly drawing a finished cover 22 by moving it through the pass 322 this action forming the flange 23 between the punch 328 and the die plate 321. The formed can cover with inserted spout is forced downwardly through the die plate 321 into an enlarged channel 331 passing through die members 33, 34 and 35, through which it falls by gravity into discharged position.

This completes the operations necessary for producing pouring spout can covers. As the punch parts 257, 324 and 328 move upwardly following this operation, stripper ring 325 forces the cover strip 21 off the cut edge 324 and leaves the same resting upon the die plate 321 and die block 35.

It is thought that the invention and many of its attendant advantages will be understood from the foregoing description and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. A machine for producing pouring spout can covers, comprising in combination means for cutting spout openings in a cover strip of sheet material, devices for movably securing formed spouts within said openings and die members for cutting and forming can covers from said strip.

2. A machine for producing pouring spout can covers, comprising in combination feeding devices for advancing a cover strip of sheet material through the machine, means for cutting spout openings in said strips, devices for movably securing formed spouts within said openings, and die members for cutting and forming can covers from said strip.

3. A machine for producing pouring spout can covers, comprising in combination means for cutting spout openings in a cover strip of sheet material, devices for hingedly securing formed spouts within said openings and die members for cutting and forming can covers from said strip.

4. A machine for producing pouring spout can covers, comprising in combination means for cutting spout openings in a cover strip of sheet material, mechanism for inserting formed spouts within said openings, devices for movably securing the spouts within the openings and die members for cutting and forming can covers from said strip.

5. A machine for producing pouring spout can covers, comprising in combination means for cutting spout openings in a cover strip of sheet material, mechanism for inserting formed spouts within said openings, devices for hingedly securing the spouts within the openings by attaching parts thereof to said cover strips, and die members for cutting and forming can covers from said strip.

6. A spout inserting mechanism which comprises a spout inserting tool, feeding devices for presenting to said tool a formed can spout, spout holding instrumentalities for guiding said spout into hinging position relative to a can cover element while the spout is being carried by the inserting tool, and means for actuating the various parts of the inserting mecahnism in proper synchronism.

7. A spout inserting mechanism which comprises a spout inserting tool, feeding devices for presenting to said tool a formed can spout having resilient side wings, spout holding instrumentalities for guiding said spout while the spout is being carried by the inserting tool, directing walls for pressing said resilient side wings toward each other during their insertion through an opening formed in a can cover element, and means for actuating the various parts of the inserting mechanism in proper synchronism.

8. In a machine for producing pouring spout can covers, the combination of a spout inserting tool, feeding devices for presenting to said tool a formed can spout, spout holding instrumentalities for guiding said spout into an opening formed in a can cover element while the spout is being carried by the inserting tool, clinching members for hingedly securing said spout within said opening, and means for actuating the various mechanisms in proper synchronism.

9. In a machine for producing pouring spout can covers, the combination of a spout inserting tool, feeding devices for presenting to said tool a formed can spout, spout holding instrumentalities for guiding said spout into an opening formed in a can cover element while the spout is being carried by the inserting tool, devices for initially bending and thereby retaining a part of said spout in inserted position, clinching members for hingedly securing said spout within said opening, and means for actuating the various mechanisms in proper synchronism.

10. In a machine for producing pouring spout can covers, the combination of a spout inserting tool, feeding devices for presenting to said tool a formed can spout, spout holding instrumentalities for guiding said spout into an opening formed in a can cover strip while the spout is being carried by the inserting tool, clinching members for hingedly securing said spout within said opening, die members for cutting and forming can covers from said strip, and means for actuating the various mechanisms in proper synchronism.

11. In a machine for producing pouring spout can covers, the combination of a spout inserting tool, feeding devices for presenting to said tool a formed can spout, spout holding instrumentalities for guiding said spout into an opening formed in a can cover strip while the spout is being carried by the inserting tool, devices for initially bending and thereby retaining a part of said spout in inserted position, clinching members for hingedly securing said spout within said opening, die members for cutting and forming can covers from said strip, and means for actuating the various mechanisms in proper synchronism.

12. A spout inserting mechanism comprising a table, a clamping device for holding a can cover element on said table, a spout inserting tool, feeding devices for presenting to said tool a formed can spout, a hinged pair of spout holding instrumentalities surrounding said tool and also surrounding a spout positioned by the feeding devices, and means for moving the inserting tool and inserting said spout carried thereby into an opening formed in the can cover element while the same is held upon said table.

13. A spout inserting mechanism comprising a table, a clamping device for holding a can cover element on said table, a spout inserting tool, feeding devices for presenting to said tool a formed can spout, having resilient side wings, a hinged pair of spout holding instrumentalities surrounding said tool and also surrounding a spout positioned by the feeding devices, directing walls carried by said instrumentalities, means for moving the inserting tool and forcing the side wings of the spout carried thereby along the directing walls whereby said wings are pressed toward each other and the spout inserted into an opening formed in the can cover element while the same is held upon said table.

14. A spout inserting mechanism comprising a table, a clamping device for holding a can cover element on said table, a spout inserting tool, feeding devices for presenting to said tool a formed can spout having resilient side wings, a hinged pair of spout holding instrumentalities surrounding said tool and also surrounding a spout positioned by the feeding devices, directing walls carried by said instrumentalities, means for moving the inserting tool and forcing the side wings of the spout carried thereby along the directing walls whereby said wings are pressed toward each other and the spout inserted into an opening formed in the can cover element while the same is held upon said table, and mechanism for opening the pair of spout holding instrumentalities to permit removal of the spout therefrom by moving the same about their hinge connections.

15. In a machine for producing pouring spout can covers, the combination of a table, feeding devices for intermittently advancing a cover strip of sheet material across the table, a primary set of clamping devices for holding said cover strip at a station, means at said station for cutting spout openings in said strip while so held, a second set of clamping devices for holding said cover strip at a second station, mechanism at the second station for inserting formed spouts within said openings of the strip while so held, a third set of clamping devices for holding said cover strip at a third station and die members at the third station for cutting and forming can covers from said strip while so held, the mechanism at the three stations synchronizing with the feeding devices and with each other.

16. A machine for producing pouring spout can covers, comprising in combination intermittently moving feeding devices for advancing cover strips of sheet material through the machine and past a plurality of operating stations, means at a said station for cutting spout openings in the strips, devices at another station for inserting formed spouts within the said openings, clinching mechanism at another station for hingedly securing the inserted spouts onto the cover strips and die members at another station for severing blanks containing pouring spouts from the cover strips and forming the blanks into pouring spout can covers, the mechanisms at the various stations operating intermediate the advancing movements of the cover strip feeding devices.

17. A spout inserting mechanism, comprising a spout inserting tool, a primary feeding device for moving formed can spouts in processional order toward said tool, secondary feeding devices for positioning an individual spout onto the inserting tool, means for moving the inserting tool and inserting its superimposed spout into an opening formed in a can cover element, and a manual control for interrupting the feeding of can spouts to the inserting tool.

18. The method of producing pouring spout can covers, which comprises forming spout openings in a cover strip of sheet material, inserting formed pouring spouts within said openings, securing a part of said spout to said strip, and then forming a can cover containing a pouring spout from said cover strip.

19. The method of producing pouring spout can covers, which comprises holding a can cover element in stationary position, pressing resilient side wings of a formed pouring spout together while inserting said spout through an opening in said can cover element, and then securing a part of the spout in hinging position on said can cover element.

WILLIAM R. LORD.